July 17, 1951  D. H. WAARA  2,561,006
STAMPED SHEET METAL MOLDING CLIP
Filed July 17, 1946
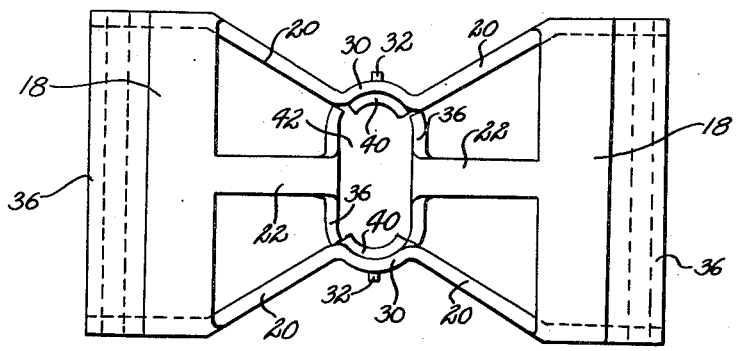
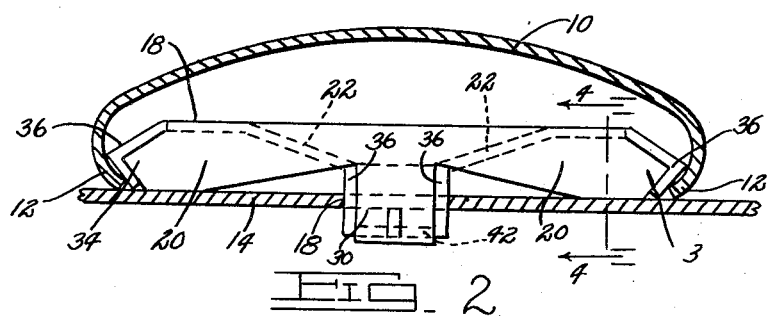
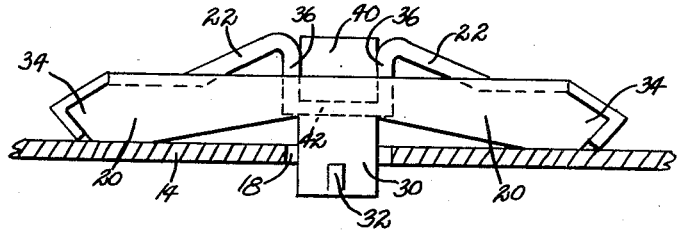
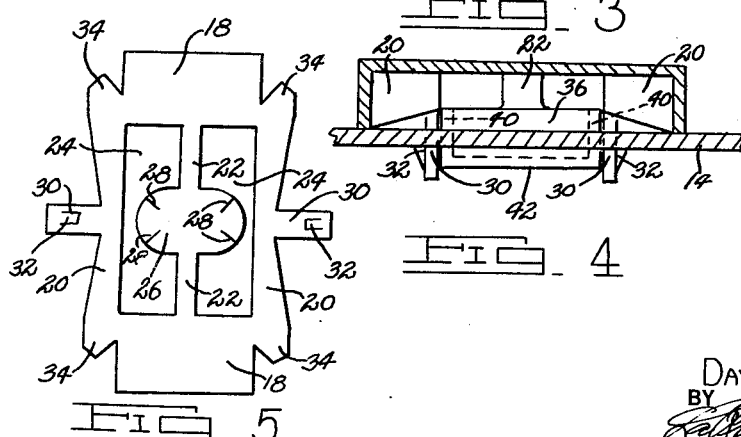
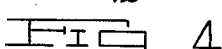
INVENTOR
DAVID H. WAARA
BY
ATTORNEY Patented July 17, 1951

2,561,006

UNITED STATES PATENT OFFICE 2,561,006

STAMPED SHEET METAL MOLDING CLIP

David H. Waara, Detroit, Mich., assignor to Robert L. Brown, Ferndale, Mich.

Application July 17, 1946, Serial No. 684,224

3 Claims. (Cl. 24—73)

This invention relates to a fastener and more particularly to a stamped sheet metal fastener for insertion in an opening for securing finished objects to supporting surfaces, especially those readily accessible from one side only.

A primary object of the invention is to provide a spring fastening device which is designed to secure a molding or other decorative part to a supporting member through an aperture in the supporting member.

Another object of the invention is to provide a stamped sheet metal fastener which is spring pressed into an aperture in the supporting member which, when in assembled position closes the aperture and further provides securing means for the article to be attached to the supporting member.

A further object of the invention is to provide resilient movable fingers which snap into the aperture in a supporting member and which are held in locked position by closing means for the aperture.

Other objects and advantages of the invention will more fully appear from the following description taken in connection with the accompanying drawings in which:

Fig. 1 is a top plan view of the fastener formed to its assembled shape as applied to a supporting member;

Fig. 2 illustrates the improved molding fastener in fastened position to a supporting member; the fastener being shown in side elevation with the applied molding in section;

Fig. 3 is a view corresponding to Fig. 2 illustrating the fastener before it is deformed into locked position and without the molding;

Fig. 4 is a sectional view taken on line 4—4 of Fig. 2; and

Fig. 5 is a top plan view of a single stamped blank from which the fastener is formed, shown in reduced scale.

Referring to the drawings, 10 represents a hollow molding or trim strip provided with the usual inturned flanges 12 which is to be mounted on an aperture supporting member 14. In mounting the molding, the supporting structure is previously provided with longitudinally spaced apertures 16. The fasteners are assembled in the spaced apertures and the molding is assembled by springing the inwardly projecting flanges 12 over holding portions on the assembled fasteners.

Referring to Fig. 5 there is illustrated a blank stamped from sheet metal from which the fastener is formed. The blank comprises spaced rectangular end sections 18 connected together by lateral strips 20 and a central strip 22 providing cut out portions 24. The central strip 22 is provided with lateral flanges 26 which are sheared at 28 at four places from the outer edges toward the center to permit bending more fully described.

The lateral strips 20 have their outer, longitudinal edges cut diagonally toward outwardly extending flanges 30 which are substantially rectangular in shape. Lugs 32 are sheared out of the body of the flanges 30 to be later bent forming holding means. The outer ends of the lateral strips are formed V shaped as indicated at 34.

In forming the fastener to final shape for insertion in an aperture, the lateral strips 20 are bent downwardly at right angles to the rectangular end sections 18 forming a channel. The outer ends of the rectangular sections 18 are bent downwardly over the V shaped ends 34 providing attaching flanges 36 over which the inturned flanges 12 of the molding 10 are sprung when assembled.

The central portion of the lateral strips 20, adjacent the downwardly extending flanges 30 are pressed inwardly toward the central strip 22 causing the strip 20 to assume an upwardly diverging position, as illustrated in Fig. 3. At the same time the flanges 26 are bent to cup shaped formation having upstanding walls 38 and 40 and a bottom wall 42.

When the fastener is assembled the downwardly extending flanges are inserted in the aperture 18, in contact with the opposite edges of the aperture. The outwardly turned lugs 32 engage the under surface of the supporting member 14. These may be manually pressed outwardly after passing through the aperture or if the material is made of spring steel they will be forced into the plane of the flanges 30 while being forced through the aperture and then sprung outwardly under the lower surface of supporting member 14 after passing through the aperture. Fig. 3 illustrates the fastener in such position. The final assembly is then made by forcing the cup shaped portion through the aperture by bending the strip 22 downwardly, as indicated in Fig. 2, with the bottom wall and flanges 36 closing the aperture.

After the fasteners have been applied to the supporting member 14 the molding 10 is snapped over the fasteners with the inwardly extending flanges in holding engagement with the V shaped end 36.

While one form of the invention has been illustrated and described in detail, it will be understood that various changes including the size, shape and arrangement of parts may be made without departing from the spirit of my invention and it is not my intention to limit its scope other than by the terms of the appended claims.

I claim:

1. A fastener comprising, spaced end sections, lateral strips connecting said end sections and extending in a plane at right angles to said end sections, said strips being inwardly offset relative to the lateral edges of said end sections, downwardly extending flanges carried by the offset portion of said strips adapted to be received in an opening in a supporting member to which the fastener is to be applied, a central strip connecting said end sections diverging centrally and upwardly from the plane of said end sections, and an enlarged portion carried by said central strip.

2. A fastener comprising a body portion for application to a supporting surface having an aperture therein, an upwardly offset portion in said body portion, spaced downwardly extending flanges on said body portion adapted to be inserted through the aperture, offset tabs on said flanges for engagement with the under surface of the supporting member, and a downwardly extending portion carried by said offset portion closing the space between said flanges for retaining said tabs in engagement with the under surface of the supporting member when the upwardly offset portion is pressed into the plane of the body portion and flush with the upper surface of the supporting member.

3. A fastener comprising a body portion for application to a supporting surface having an aperture therein, an upwardly offset portion in said body portion, spaced downwardly extending flanges on said body portion adapted to be inserted through the aperture, offset tabs on said flanges for engagement with the under surface of the supporting member, a downwardly extending portion carried by said offset portion between said flanges for retaining said tabs in engagement with the under surface of the supporting member when the upwardly offset portion is pressed into the plane of the body portion and flush with the upper surface of the supporting member and attaching flanges at opposite edges of said body portion.

DAVID H. WAARA.

REFERENCES CITED

The following references are of record in the file of this patent:

UNITED STATES PATENTS

| Number | Name | Date |
| --- | --- | --- |
| 936,148 | McConnell et al. | Oct. 5, 1909 |
| 2,142,429 | Wiley | Jan. 3, 1939 |
| 2,161,464 | Gilbert | June 6, 1939 |
| 2,201,335 | Cotter | May 21, 1940 |
| 2,258,788 | Meyer et al. | Oct. 14, 1941 |
| 2,275,773 | Kost | Mar. 10, 1942 |
| 2,306,460 | Meyer et al. | Dec. 29, 1942 |
| 2,409,966 | Voity et al. | Oct. 22, 1946 |
| 2,421,045 | Walsh | May 27, 1947 |